(12) United States Patent
Pitti

(10) Patent No.: US 10,984,450 B2
(45) Date of Patent: Apr. 20, 2021

(54) SYSTEM AND METHOD TO PROVIDE AN INTEGRATED ADVERTISING PLATFORM

(71) Applicant: Abhishek Pitti, Attapur (IN)

(72) Inventor: Abhishek Pitti, Attapur (IN)

(*) Notice: Subject to any disclaimer, the term of this patent is extended or adjusted under 35 U.S.C. 154(b) by 183 days.

(21) Appl. No.: 16/149,397

(22) Filed: Oct. 2, 2018

(65) Prior Publication Data

US 2019/0102800 A1 Apr. 4, 2019

Related U.S. Application Data

(60) Provisional application No. 62/567,250, filed on Oct. 3, 2017.

(51) Int. Cl.
*G06Q 30/00* (2012.01)
*G06Q 30/02* (2012.01)
*H04L 29/08* (2006.01)
*H04W 4/021* (2018.01)
*H04W 4/23* (2018.01)
(Continued)

(52) U.S. Cl.
CPC ......... *G06Q 30/0267* (2013.01); *G06N 20/00* (2019.01); *G06Q 30/0261* (2013.01); *H04L 67/22* (2013.01); *H04L 67/306* (2013.01); *H04W 4/021* (2013.01); *H04W 4/14* (2013.01); *H04W 4/23* (2018.02); *H04W 4/38* (2018.02); *H04W 4/80* (2018.02)

(58) Field of Classification Search
CPC . G06Q 30/0267; G06Q 30/0261; H04W 4/23; H04W 4/38; H04W 4/80; H04W 4/021; H04W 4/14; G06N 20/00; H04L 67/22; H04L 67/306

USPC ....................................................... 705/14.58
See application file for complete search history.

(56) References Cited

U.S. PATENT DOCUMENTS 8,782,424 B2 * 7/2014 Machani ................. H04L 51/38
713/182
9,661,602 B2 * 5/2017 Annamalai ........... H04W 76/50
(Continued)

OTHER PUBLICATIONS

Golding (2011).*
(Continued)

*Primary Examiner* — Azam A Ansari
*Assistant Examiner* — Michael I Ezewoko
(74) *Attorney, Agent, or Firm* — Richard Eldredge; Leavitt Eldredge Law Firm

(57) ABSTRACT

A system to provide an integrated advertising platform includes a sensor unit, communication module, telecom server unit, consent database, database unit, application server unit, and retailer computing unit. The sensor unit is installed within a premise to detect the presence of a consented user equipment (UE) in proximity and retrieves an identification number associated with the consented UE. The communication module transmits the retrieved identification number and sensor identification number to the telecom server unit that matches the identification number with an MSISDN. The consent database stores the consent status of the MSISDN. The database unit receives a sensor identification number, system identification number, and MSISDN from the consent database. The application server unit customizes the offer corresponding to the user through a machine learning module and transmits the customized offer to the consented user equipment UE.

7 Claims, 5 Drawing Sheets

(51) Int. Cl.
*G06N 20/00* (2019.01)
*H04W 4/14* (2009.01)
*H04W 4/38* (2018.01)
*H04W 4/80* (2018.01)

(56) References Cited

U.S. PATENT DOCUMENTS

| | | | |
|---|---|---|---|
| 9,691,082 B1 * | 6/2017 | Burnett | G06Q 30/02 |
| 10,275,800 B2 * | 4/2019 | Shaw | H04L 51/38 |
| 2009/0075635 A1 * | 3/2009 | Russell | G06Q 20/382 |
| | | | 455/414.2 |

OTHER PUBLICATIONS

Gray (1999).*
Mindell (2015).*
101 references.*
Grier (2005).*
Hayles (2005).*
Islands of Genius (2010).*
Landau (2010).*

* cited by examiner

SYSTEM AND METHOD TO PROVIDE AN INTEGRATED ADVERTISING PLATFORM

BACKGROUND

1. Field of the Invention

The present invention relates generally to internet of things (IoT) systems, and more specifically, to a machine learning based system and method to provide an integrated advertising platform to retrieve, and process user-related data from a consented user equipment (UE) to customize offers and further transmit the offer to the consented user equipment (UE) over a communication network.

2. Description of Related Art

Advertisement systems are well known in the art. Over the last decade, customers are making more and more purchases via the internet from various online vendors. Such online vendors commonly track prior purchases of the customer as data. The online vendors can then use this data to provide the customers with customized recommendations based on purchase history, browsing history and other customer data. Thus, the online vendors provide a more consistent shopping experience to the customer.

One of the problems commonly associated with in person advertisement systems, is that there are no such system and method which can identify the customer in real-time when people are in brick and mortar stores to personalize their shopping experience.

It should be appreciated that customization in the shopping experience has great advantages. For example, from an IPSOS consumer survey, 67% of consumers acknowledged that they are more likely to purchase when a brand localizes and personalizes digital communication. With the growing online presence, the brick and mortar stores are feeling the pinch for more personalized customer service and promotions to sustain customer base and differentiate them from online websites.

Therefore, there is a need for a system and method for curtailing existing limitations of brick and mortar stores and other customer-facing businesses such as restaurants, insurance, hospitality, etc. to compete with the online vendors and to provide a hassle-free, fully customized and personalized in-store shopping experience to the customers.

Further, there is also a need for a machine learning-based system and method to provide an integrated advertising platform that can retrieve and process the user-related data from a consented user equipment (UE) to customize offers and further transmits the offer to the consented user equipment (UE) over a communication network.

Accordingly, although great strides have been made in advertisement systems, many shortcomings remain.

SUMMARY OF THE INVENTION

A system and method to provide an integrated advertising platform are provided substantially, as shown in and/or described in connection with at least one of the figures, as set forth more completely in the claims.

An aspect of the present disclosure relates to a system to provide an integrated advertising platform. The system comprises a sensor unit, a communication module, a telecom server unit, a consent database, a database unit, an application server unit, and a retailer computing unit. The sensor unit is installed in premises to detect the presence of a consented user equipment (UE) in proximity and retrieves an identification number associated with the consented user equipment (UE) by establishing a radio signal communication with the consented user equipment (UE). The communication module is integrated with the sensor unit to transmit the retrieved identification number and a sensor identification number over a communication network. The telecom server unit is connected with the communication module over the communication network matches the identification number with a mobile station international subscriber directory number (MSISDN).

The mapped identification number and a mobile station international subscriber directory number (MSISDN) stored in a master table (MT) is connected with the telecom server unit. The consent database is connected with the telecom server unit to store a plurality of consent status of the MSISDN. The consent database stores the MSISDN, the sensor identification number, a channel of activation, date and time stamp of activation, a consent flag, and a system identification number. The database unit is communicatively coupled with the consent database to receive a sensor identification number, system identification number, and MSISDN and transmits an acknowledgment message to the consent database.

The application server unit is configured with the database unit to receive the sensor identification number, system identification number, and MSISDN. The application server unit stores data pertaining to a plurality of offers and transmits one or more offer to the consented user equipment (UE) through a predefined communication channel. The retailer computing unit procures data related to the user and transmits to the application server unit. The data related to the user enables the application server unit to customize the offer corresponding to the user through a machine learning module and transmits the customized offer to the consented user equipment (UE).

In an aspect, the master table (MT) stores the system identification number and non-personally identifiable information (non-PII).

In an aspect, the machine learning module segments the users based on the data of the users procured by the retailer computing unit.

In an aspect, the application server unit further stores a replica of the consent database, a plurality of reports and analytics pertaining to the behavior of the user.

An aspect of the present disclosure relates to a method to provide an integrated advertising platform. The method comprises steps of detecting a presence of a consented user equipment (UE) in proximity and retrieves an identification number associated with the consented user equipment (UE) by establishing a radio signal communication with the consented user equipment (UE) through a sensor unit installed in premises. The method comprises a step of transmitting the retrieved identification number and a sensor identification number over a communication network through a communication module.

Further, the method includes a step of matching the identification number with a mobile station international subscriber directory number (MSISDN) through a telecom server unit. The mapped identification number and a mobile station international subscriber directory number (MSISDN) stored in a master table (MT) connected with the telecom server unit. The method then includes a step of storing a plurality of consent status of the MSISDN in a consent database. The consent database stores the MSISDN, the sensor identification number, a channel of activation, date and time stamp of activation, a consent flag, and a system identification number.

The method then includes the step of receiving a sensor identification number, system identification number, and MSISDN through a database unit and the database unit further transmits an acknowledgment message to the consent database. Furthermore, the method includes the step of receiving the sensor identification number, system identification number, and MSISDN through an application server unit. The application server unit stores data pertaining to a plurality of offers and transmits one or more offer to the consented user equipment (UE) through a predefined communication channel.

The method then includes the step of procuring data related to the user and transmitting the procured data to the application server unit through a retailer computing unit. Further, the method includes the step of customizing the offer corresponding to the user based on the data related to the user through the application server unit and transmitting the customized offer to the consented user equipment (UE). The application server unit utilizes a machine learning module to process the data related to the user to customize the offer.

Accordingly, one advantage of the present invention is that it retrieves the data related to the user and provide the customized offer on prior consent of the users.

Another advantage of the present invention is that it enhances user's shopping experience by providing the customers with smart and customized offers such as discount coupons, special offers, notifications when the user is present at the retail store or any other business location.

Another advantage of the present invention is that it provides a new revenue stream to a telecom operator by monetizing the existing telecom network and providing customer insights.

Still another advantage of the present invention is that it improves the ability of the retailers to personalize marketing and service in-store in real time as well as create a bridge between the online and offline sales experience.

Another advantage of the present invention is that it provides an in-store marketing platform to retailers and free offer subscription to customers.

Another advantage of the present invention is that the present system and method substantially reduces the cost of an infrastructure set up to accomplish OTPs operations by just mapping the user's phone number and the identification number of the computing device through the integrated telecom operators.

Other features of embodiments of the present disclosure will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
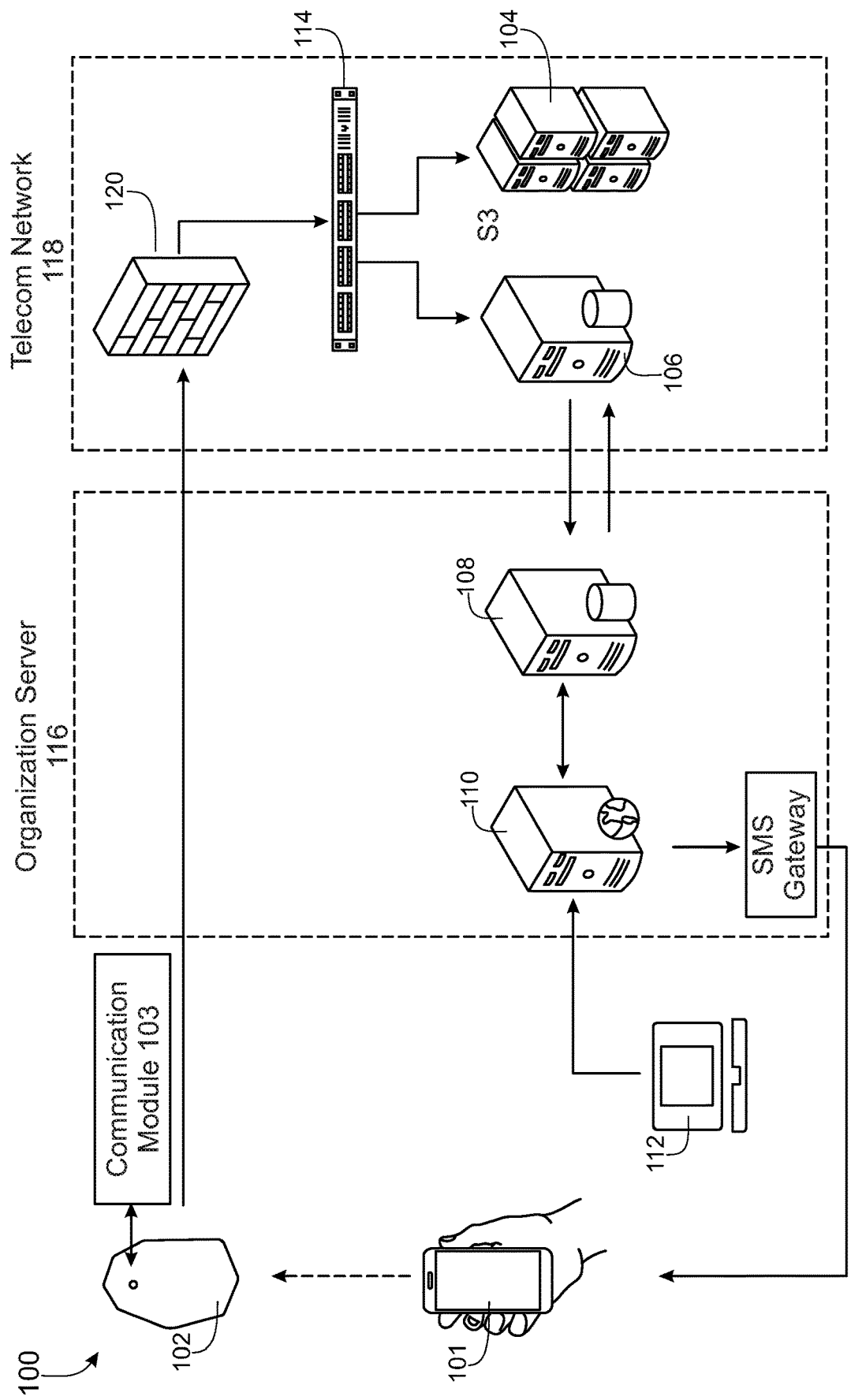
FIG. 1 is a schematic of the system of the present invention having an integrated advertising platform in accordance with an embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional brick and mortar advertisement systems. Specifically, the present invention provides for an improved means of advertising with the particular consumer in mind, based on machine learning. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a system to provide an integrated advertisement platform in accordance with a preferred embodiment of the present application. It will be appreciated that the system overcomes one of more of the above-listed limitations commonly associated with conventional brick and mortar advertisement systems.

In the contemplated embodiment, the system 100 includes a sensor unit 102, a communication module 103, a telecom server unit 104, a consent database 106, a database unit 108, an application server unit 110, and a retailer computing unit 112. The sensor unit 102 is installed in premises (such as within a store) to detect the presence of a consented user equipment (UE) 101 in proximity and retrieves an identification number associated with the consented user equipment (UE) 101 by establishing a radio signal communication with the consented user equipment (UE) 101. Examples of the consented user equipment (UE) 101 include, but are not limited to, a personal digital assistant (PDA), a mobile device, a tablet, a smartphone or any other computing device. In an embodiment, the present sensor is modified "femtocell", however, any sensor with the similar abilities could be used herein.

In the preferred embodiment, the communication module 103 is integrated with the sensor unit 102 to transmit the retrieved identification number and a sensor identification number to the telecom server unit 104 over a communication network. The communication network includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Further, in the preferred embodiment, the communication module 103 establishes a secure communication network to establish a communication between the sensor unit 102 and the telecom server unit 104. The sensor unit 102, in some embodiments, uses AES 256 bits of encryption technique to secure the communication. To achieve this encryption, the sensor unit 102 uses an open-SSL third party library. The data to be transmitted is ciphered using 256 bits secret cryptographic key which is deciphered at the telecom server unit 104 using the same secret key. Further, the JSON information is transmitted via the https request/response so that data is sent via a secure channel and encrypted while sending back to the telecom server unit 104. The JSON module initiates a POST request on a specified REST URL at a backend Server. The POST request has the following JSON format:

"timestamp": 1455794645, /* This is time in msec since epoc time*/
"uniqueId": "ABCxx123", /* This is unique hardware identifier*/
"mobileCarrier": "xyz", /* Mobile Carrier Name or ID */
"identification number": "123456789012345"

In at least some embodiments, the telecom server unit 104 is connected with the communication module 103 over the communication network to match the identification number with a mobile station international subscriber directory number (MSISDN). The mapped identification number and a mobile station international subscriber directory number (MSISDN) stored in a master table (MT) connected with the telecom server unit 104. In an embodiment, the master table (MT) stores the system identification number and non-personally identifiable information (non-PII).

The consent database 106 is connected with the telecom server unit 104 to store a plurality of consent status of the MSISDN. The consent database 106 stores the MSISDN, the sensor identification number, a channel of activation, date and time stamp of activation, a consent flag, and a system identification number. In an embodiment, the consent database 16 is maintained at the telecom server unit 104 hosted behind a telecom firewall 120.

In the preferred embodiment, the database unit 108 is communicatively coupled with the consent database 106 to receive a sensor identification number, system identification number, and MSISDN and transmits an acknowledgment message to the consent database 106. In an embodiment, the consent database 106 and the database unit 108 is realized through various technologies such as, but not limited to, Microsoft® SQL Server, Oracle®, IBM DB2®, Microsoft Access®, PostgreSQL®, MySQL® and SQLite®, and the like.

The application server unit 110 is configured with the database unit 108 to receive the sensor identification number, system identification number, and MSISDN. In an embodiment, the application server unit 110, and the database unit 108 are installed at the organization server 116. Further, in some embodiments, a firewall 120, a switch unit 114, the telecom server unit 104, and the consent database 106 are installed at the telecom network 118. It should be appreciated that the precise organization can be altered.

The application server unit 110 stores data pertaining to a plurality of offers and transmits one or more offer to the consented user equipment (UE) through a predefined communication channel. The switch unit 114 may connect the telecom server unit 104 with other servers to make up a network. Further, the switch unit 114 enables the devices inside the telecom network 118 to communicate with each other, as well as with other networks. Essentially, the switch unit 114 is configured to connect multiple devices on the same telecom network 118 within a telecom data center.

The retailer computing unit 112 is configured to procure data related to the user and transmits the data to the application server unit 110. Examples of the retailer computing unit 112 include, but are not limited to, a personal digital assistant (PDA), a mobile device, a tablet, a smartphone or any other computing device. The data related to the user enables the application server unit 110 to customize the offer corresponding to the user through a machine learning module and transmits the customized offer to the consented user equipment (UE) 101. In an embodiment, the machine learning module segments the users based on the data of the users procured by the retailer computing unit 112. In an embodiment, the application server unit 110 further stores a replica of the consent database 106, a plurality of reports and analytics pertaining to the behavior of the user.

In an embodiment, the application server unit 110 executes procedures such as, but not limited to, programs, routines, or scripts stored in one or more memories for supporting the hosted application or the software service. In an embodiment, the hosted application or the software service is configured to perform one or more predetermined operations. Examples of the application server unit 110 include but not limited to a Java application server, a .NET framework application server, a Base4 application server, a PHP framework application server, or any other application server framework.

It should be appreciated that one of the unique features believed characteristic of the present application is the configuration of the system to collect data from the user, as well as to verify consent of the user through the process described above, wherein the store (or the like) can then provide tailored advertisements to the customer through the customer's device.

Figure 2:
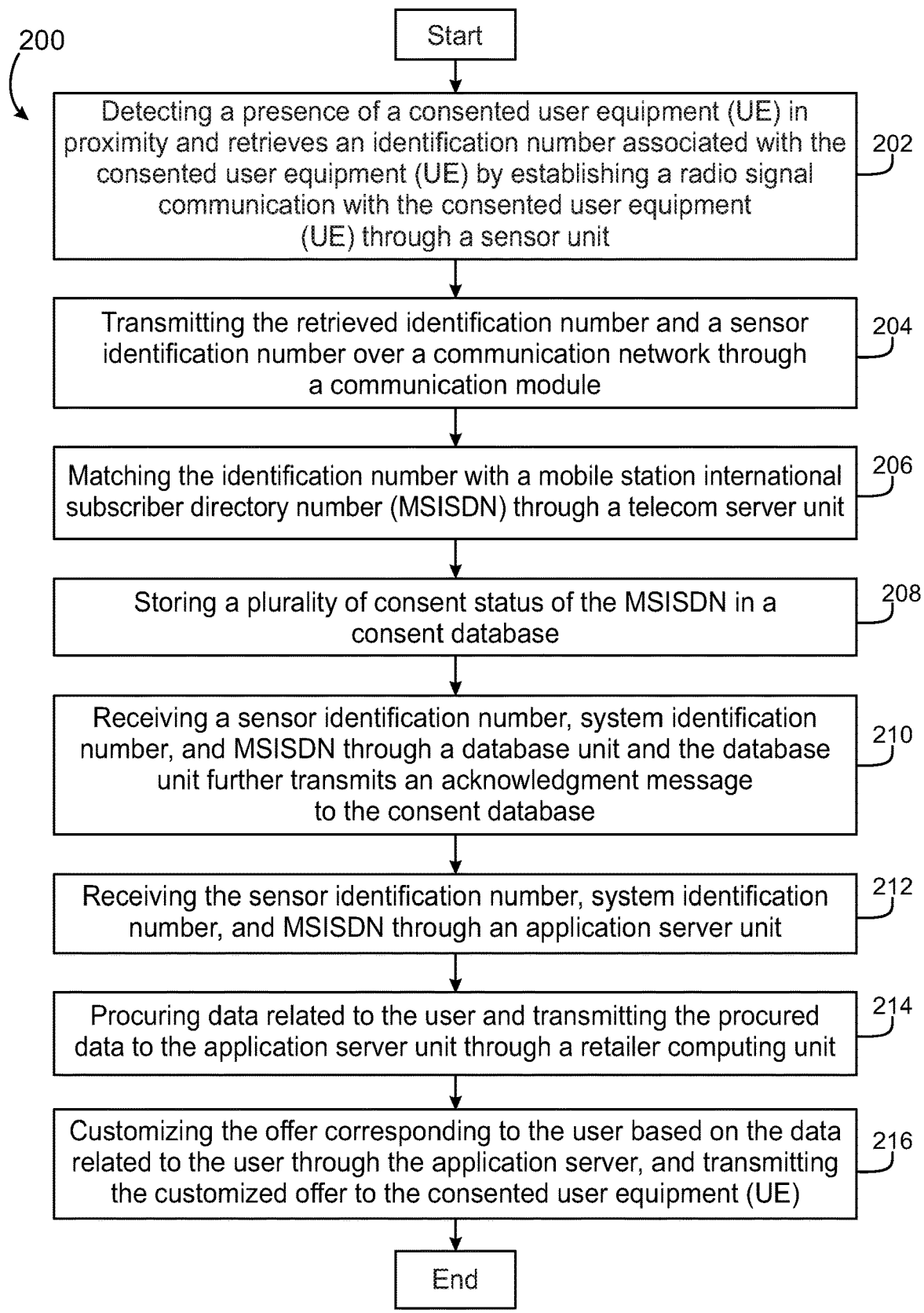
FIG. 2 is a flowchart of a method associated with the system of FIG. 1, in accordance with an embodiment of the present application.

FIG. 2 illustrates a flowchart 200 of the method to provide an integrated advertising platform, in accordance with an embodiment of the present invention. The method comprises a step 202 of detecting a presence of a consented user equipment (UE) in proximity and retrieves an identification number associated with the consented user equipment (UE) by establishing a radio signal communication with the consented user equipment (UE) through a sensor unit installed in premises. The method comprises a step 204 of transmitting the retrieved identification number and a sensor identification number over a communication network through a communication module.

Further, the method includes a step 206 of matching the identification number with a mobile station international subscriber directory number (MSISDN) through a telecom server unit. The mapped identification number and a mobile station international subscriber directory number (MSISDN) stored in a master table (MT) connected with the telecom server unit. The method then includes a step 208 of storing a plurality of consent status of the MSISDN in a consent database. The consent database stores the MSISDN, the sensor identification number, a channel of activation, date and time stamp of activation, a consent flag, and a system identification number.

The method then includes the step 210 of receiving a sensor identification number, system identification number, and MSISDN through a database unit and the database unit further transmits an acknowledgment message to the consent database. Furthermore, the method includes the step 212 of receiving the sensor identification number, system identification number, and MSISDN through an application server unit. The application server unit stores data pertaining to a plurality of offers and transmits one or more offer to the consented user equipment (UE) through a predefined communication channel.

The method then includes the step 214 of procuring data related to the user and transmitting the procured data to the application server unit through a retailer computing unit. Further, the method includes the step 216 of customizing the offer corresponding to the user based on the data related to the user through the application server unit and transmitting the customized offer to the consented user equipment (UE). The application server unit utilizes a machine learning module to process the data related to the user to customize the offer.

Figure 3:
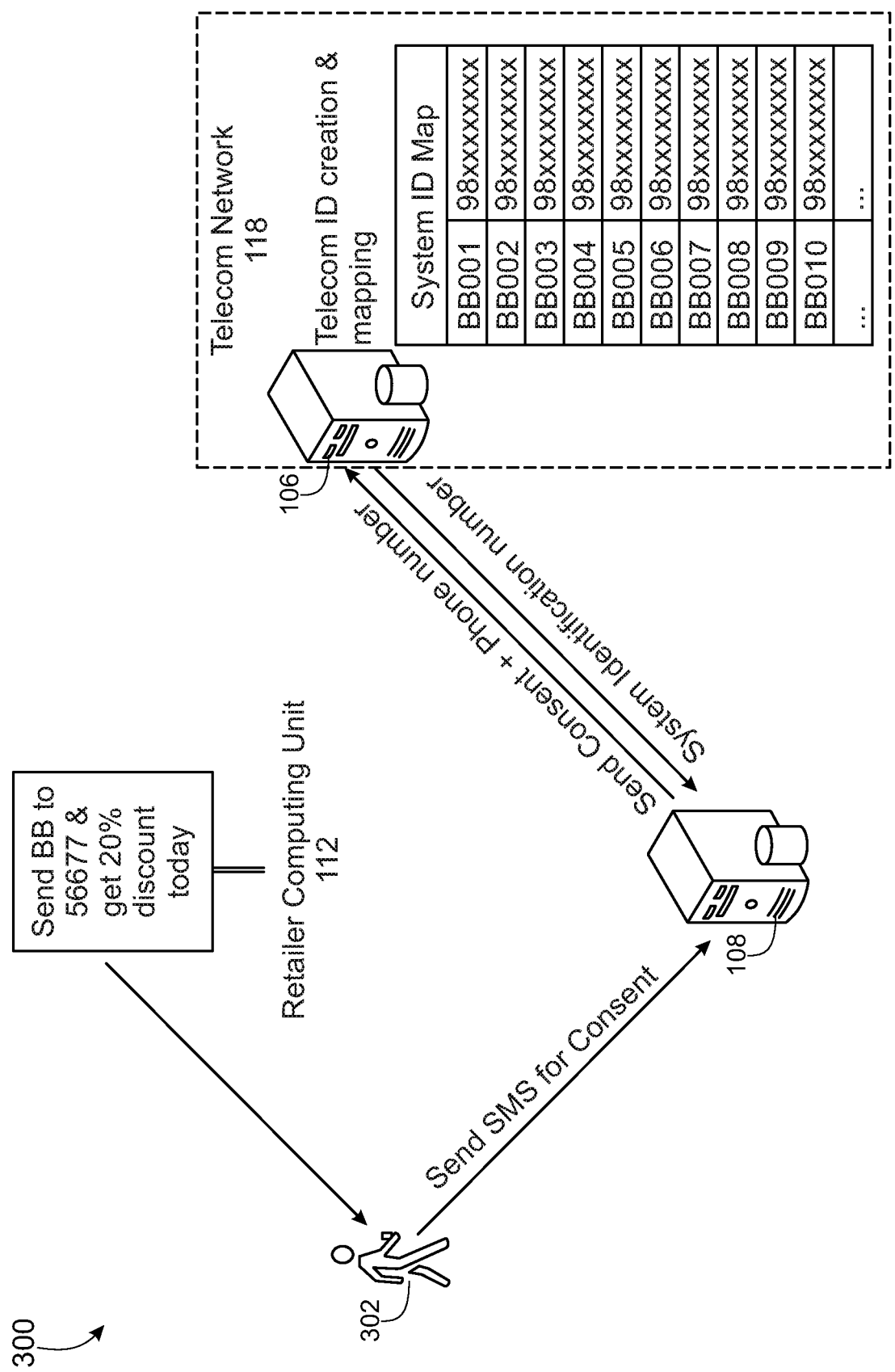
FIG. 3 is a flow diagram of steps performed by the system to request the user to provide consent, in accordance with an embodiment of the present application.

FIG. 3 illustrates an operational flow diagram 300 to depict the steps performed by the present system to request the user to provide consent, in accordance with an embodiment of the present invention. In an exemplary embodiment, the user (customer) 302 transmits an activation request via a five-digit SMS short code to the database unit 108. The SMS will be originated from the customer mobile number and routed to the application server unit via a telecom messaging gateway. The application server unit accepts the activation request and updates the database unit 108. Then the database unit 108 updates the consent database 106 installed at telecom network 118 by transmitting the consent details and phone number of the user. The consent database 106 accordingly updates the master table and CRM reports. The consent database 106 acknowledges the update by sending the system identification number to the database unit 108. Further, the application server unit sends the activation confirmation SMS along with T&C, deactivation code to the customer. Additionally, the retailer computing unit 112 may send offers along with instructions to the customer on confirmation of the received consent from the user.

Figure 4:
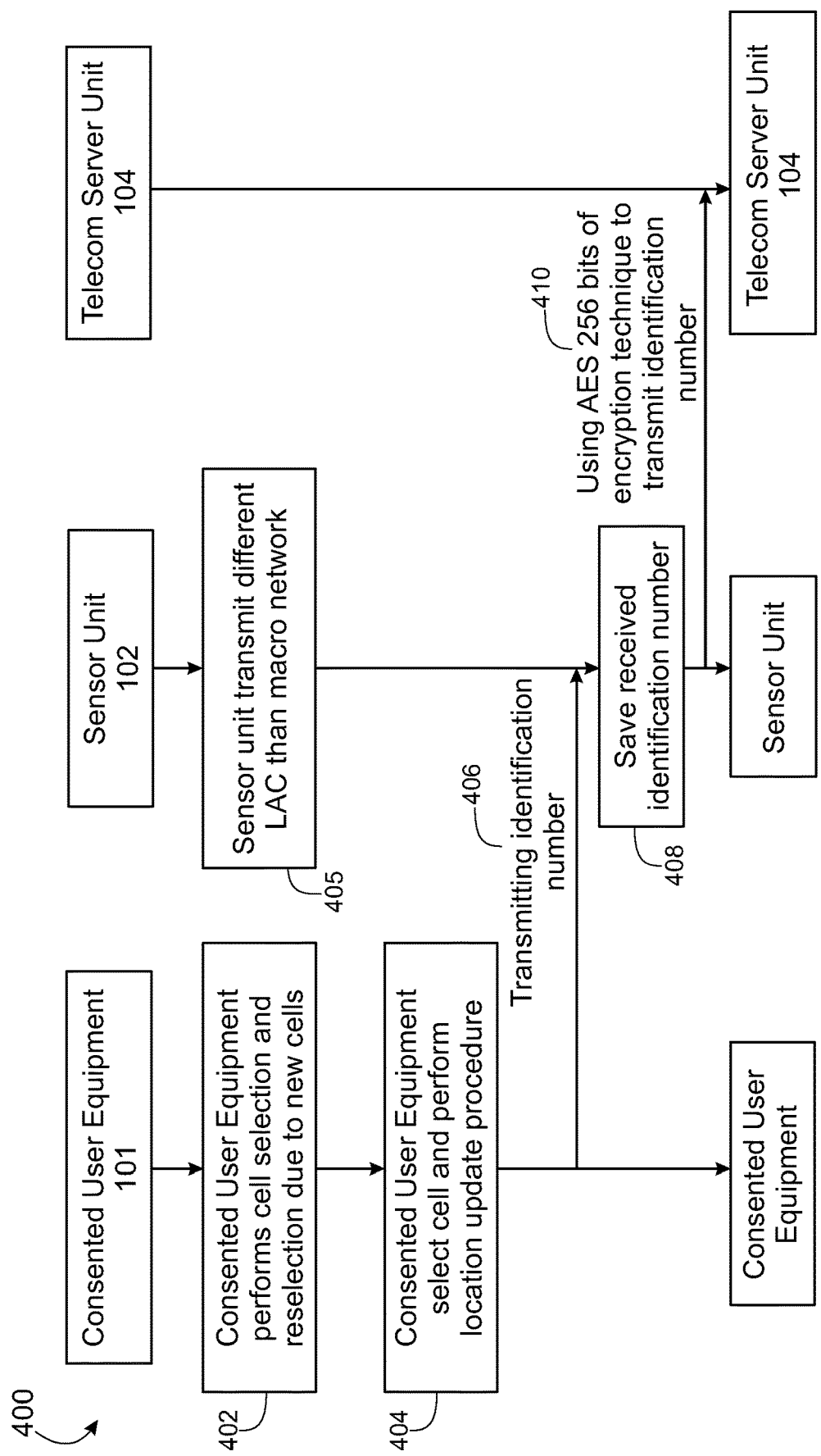
FIG. 4 is a flow diagram of a sensor unit of FIG. 1, in accordance with an embodiment of the present application.

FIG. 4 illustrates an operational flow diagram 400 of the sensor unit, in accordance with an embodiment of the present invention. In operation, the sensor unit 102 is operating on a frequency assigned by a telecom operator. At step 402, when the user (customer) enters into a transmission coverage area of the sensor unit 102, based on a cell search criteria and neighbor relationship, the consented user equipment (UE) 101 performs the cell selection and reselection to select the sensor unit. At step 405, the sensor unit 102 transmits a different LAC than a macro network. At step 404, after reading the broadcasting information, the consented user equipment (UE) 101 may perform a procedure selected from at least one of an attach procedure and a tracking area update procedure.

In the attach procedure, the consented user equipment (UE) 101 may initiate "Attach Request" to the sensor unit. In a first scenario, when a user (subscriber) is switching ON the mobile phone while being in the coverage area of the sensor unit 102, the "Attach Request" would already be having the consented user equipment (UE) 101 identity as an identity of the subscriber. So, the sensor unit 102 parses the consented user equipment (UE) 101 identity and send it towards the telecom server unit 104. When the subscriber's user equipment is in emergency (limited service mode) or the airplane mode while being in the coverage area of sensor unit 102, the consented user equipment (UE) 101 sends the "Attach Request" with GUTI, allocated previously when the consented user equipment (UE) 101 was attached to the cell of the actual telecom operator. Now, the sensor unit 102 sends "Identity Request" message for the identity of consented user equipment (UE) 101, and the user equipment will reply with the consented user equipment (UE) 101 identity in "Identity Response" message. At step 406, the consented user equipment 101 transmits the identification number to the sensor unit 102.

In the tracking area update procedure, the user, i.e., the subscriber is already attached to the cell of the telecom operator, and it moved to the coverage area of the sensor unit 102. In this scenario, the consented user equipment (UE) 101 sends "Tracking Area Update Request" message to the sensor unit 102, as TAC (Tracking Area Code) of the sensor unit is different from that of telecom operator. Now, the sensor unit will send "Identity Request" message for a consented user equipment (UE) 101 identity and then consented user equipment (UE) 101 replies back with a consented user equipment (UE) 101 identity in "Identity Response" message. At step 408, the sensor unit 102 stores the received identification number. Further, at step 410, the sensor unit 102 uses AES 256 bits of encryption technique to transmit the received identification number to the telecom server unit 104.

The present system and method provide a plurality of sign-up options to the customer to enable them to avail the advantages of the present invention. All the sign-up options converge at the application server unit to give personalized service to the customer on any preferred mode. Examples of the sign-up options include but not limited to an SMS, a mobile application, a website, retailer's software application, social pages, and telecom applications such as wallet, Wi-Fi, and self-care.

In the sign-up through SMS process, the customer sends a sign-up request to a predefined five-digit short code such as BBStart to 5XXXX. This is a customer generated SMS request. The server receives the sign-up request notification via a telecom SMS gateway. On successful notification, the server activates the services and sends the service activation message to the customer. The service activation message contains brief service details, deactivation details, T&C, and URL.

In the sign-up through mobile applications, the customer can sign-up for the present personalized offer service through software applications. The customer downloads the applications. Further, all the details, terms and conditions are part of the present system's terms & conditions. The location access permission will be taken along with other software application permissions while the customer installs the application on the computing device. There are various permissions to be taken at the time of the software application installation such as application notifications, SMS notifications, location access, (online and offline mode), update offers, read the profile, and attributes, etc.

In the sign-up through social pages, and websites such as telecom, retailer, the customer reads the service information on social pages, websites, etc. Then the customer is asked to click on the link to sign-up for the service. The customer receives the link of telecom consent gateway; the customer reads the service details and clicks on the confirmation button to sign-up for the service. The telecom consent gateway receives the customer's request and notifies the present system about the new customer acquisition. Then the present system sends the service sign-up confirmation SMS.

In the sign-up through a retailer loyalty program, the retailers may run specialized campaigns to the sign-up customer into the present services via their loyalty program. In this case, when a customer registers with retailer's loyalty program, by default, he/she will authorize retailer to use the technology provided by the present system and method to send personalized offers to the customers.

Figure 5:
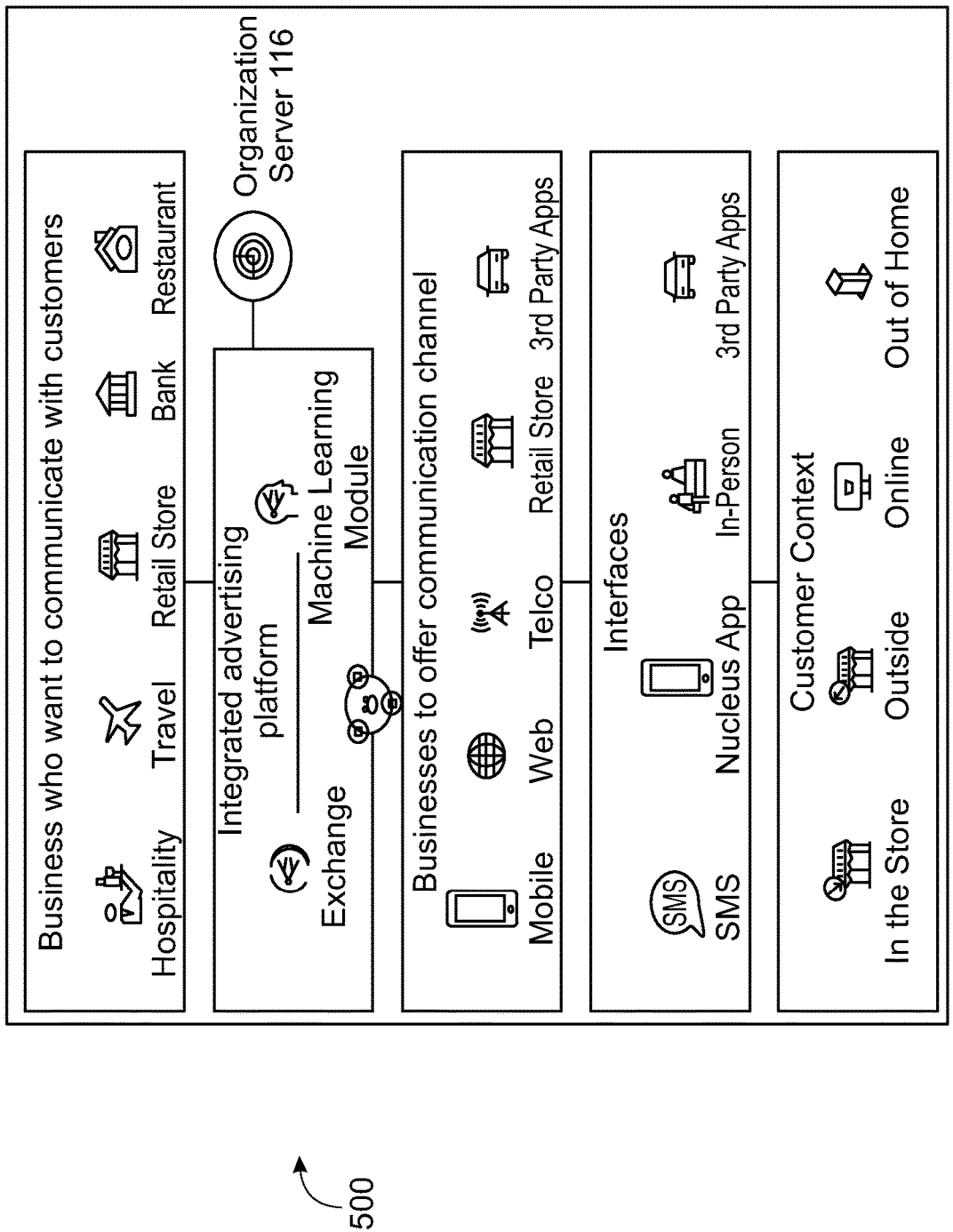
FIG. 5 is a schematic of an interaction of a plurality of actors involved in the present integrated advertising platform, in accordance with an embodiment of the present application.

FIG. 5 illustrates an exemplary interactions 500 of a plurality of actors involved in the present integrated advertising platform, in accordance with an embodiment of the present invention. The present system provides an integrated advertising platform which is a combination of a front-end interface and a state-of-the-art analytics engine that leverages the strength of the machine learning. The integrated advertising platform connects the retailers and customers at precisely the right moment to bring an element of delight and surprise to the retailer's customer service regime. For its front-end interface, the present system provides a simple and intuitive interface for brands and retailers so they can check the customer's profile in real time. This interface enables brands to know instantly how many customers are in and around the store along with customer categorization.

The application server unit utilizes a plurality of algorithms that are dynamically programmed to integrate with any retailer's POS system, which improves efficiency for the data model and provides the best offers/promotions to walk-in customers. A DIY (Do It Yourself) package help any retailer to integrate the integrated advertising platform to their existing systems easily.

The machine learning module provides value to retailers on the organization network through its ability to turn data into actionable offers and insights. The present integrated advertising platform is connected to the organization server 116, which feeds its data and provides intelligent recommendations to customers based on their physical and digital behavior. Using a machine learning module, the integrated advertising platform learns from each interaction between the customers and retailers to continuously improve its accuracy and broaden the value it can provide to customers.

The application server unit provides analytics report by using an analytics engine which is the combination of three key features i) customer visibility ii) machine learning module and iii) customer score. The integrated advertising platform is built on machine learning principles.

The integrated advertising platform works on proprietary algorithms to generate each customer's value score. These algorithms are based on the data sources mentioned above. Algorithms convert all information into aggregated analytics so information can never be breached or misused. These algorithms create brand-specific single scores for customers and a global score that gives brands a sense of whether it is profitable to approach the customer and attempt to gather more information about the customer. The high-performance algorithms receive data from the organization server 116 and telecom network 118 continuously, and self-execute to predict various aspects of customer behavior. In an embodiment, the application server unit may use predictive algorithms to determine optimal methods of reaching individual customers at various stages of the sales funnel to increase the probability of conversion and retention.

These algorithms divide customers into segments based on three numeric scores: recency, frequency and monetary. Improvement in these scores indicates an improvement in the customer's association with the brand. Whenever a new brand integrates with the present system, a compiler integrated with the machine learning module compiles the data and passes the raw attributes to an intelligence layer of the integrated advertising platform, which segments the customers. The essential goal of the present integrated advertising platform is to elevate customers into higher segments to increase the brand loyalty and stickiness.

Thus the present system and method offer customer intelligence to physical retail and other customer-facing businesses without using prevalent Wi-Fi, and Bluetooth technology. It enables the physical retailers to have the same amount of customer information which online retailers collect digitally. The present system and method allow the retailers to send a real-time personalized communication to customers in the store that helps them to increase sales conversion and improve gross margin on their products. The present system and method functions on telecom licensed radio frequency that eliminates the requirement of application installation and latching onto Wi-Fi or Bluetooth. It makes customer experience seamless and reduces the opportunity loss to retails because of the inaction of the customer.

The technology behind the present system and method works on telecom licensed frequencies and abides with telecom regulatory guidelines on customer privacy and technology perspective. Thus the solution provides by the present system, and method is utmost secure and takes care of customer privacy as it falls under highly regulated telecom domain.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system to provide an integrated advertising platform, the system comprising:
   a sensor unit installed within a premise to detect a presence of a consented user equipment (UE) in proximity and to retrieve an identification number associated with the consented user equipment (UE) by establishing a radio signal communication with the consented user equipment (UE), wherein the establishing of the radio signal communication comprises:
      transmission of a location area code (LAC) different from the one transmitted by a macro network to which the consented user equipment (UE) is attached, and
      performing a procedure selected from at least one of an attach procedure and a tracking area update procedure, by the consented user equipment (UE);
   a communication module integrated with the sensor unit to transmit the identification number and a sensor identification number over a communication network;
   a telecom server unit connected with the communication module over the communication network to match the identification number with a mobile station international subscriber directory number (MSISDN), wherein the mapped identification number and the mobile station international subscriber directory number (MSISDN) are stored in a master table (MT) connected with the telecom server unit;
   a consent database connected with the telecom server unit to store a plurality of consent status of the MSISDN, wherein the consent database stores the MSISDN, the sensor identification number, a channel of activation, date and time stamp of activation, a consent flag, and a system identification number;
   a database unit communicatively coupled with the consent database to receive a sensor identification number, the system identification number, and the MSISDN and transmits an acknowledgment message to the consent database;
   an application server unit configured with the database unit to receive the sensor identification number, system identification number, and MSISDN, wherein the application server unit stores data pertaining to a plurality of offers and transmits one or more offers to the consented user equipment (UE) through a predefined communication channel; and
   a retailer computing unit procures data related to a plurality of users and transmits to the application server unit, wherein the data related to the user enables the application server unit to customize the one or more offers corresponding to the plurality of users through a machine learning module and transmits the one or more offers to the consented user equipment (UE), wherein the machine learning module segments the users based on a plurality of numeric scores indicative of each user's association with a brand.

2. The system according to claim 1, wherein the application server unit further stores a replica of the consent database, a plurality of reports and analytics pertaining to the behavior of the user.

3. The system according to claim 1, wherein the master table (MT) stores the system identification number and non-personally identifiable information (non-PII).

4. The system according to claim 1, wherein the attach procedure comprises:
   initiating, by the user equipment (UE), an attach request comprising identification number to for attaching to the sensor unit, when the consented user equipment (UE) is detected in the proximity of the sensor unit;
   parsing, by the sensor unit, the identity of the consented user equipment (UE), wherein the parsed identity is transmitted to the telecom server unit.

5. The system according to claim 1, wherein the tracking area update procedure comprises:
   receiving, by the sensor unit, a Tracking Area Update Request message from the consented user equipment (UE);
   transmitting, by the sensor unit, an Identity Request message for the consented user equipment (UE) identity;
   receiving, by the sensor unit, the consented user equipment (UE) identity in an Identity Response message;
   storing, by the sensor unit, the received identification number; and
   encrypting, by the sensor unit, the received identification number, wherein the encrypted identification number is transmitted to the telecom server unit.

6. A method to provide an integrated advertising platform, the method comprising steps of:
   detecting a presence of a consented user equipment (UE) in proximity to sensor and receiving an identification number associated with the consented user equipment (UE) by establishing a radio signal communication with the consented user equipment (UE), wherein the establishing of the radio signal communication comprises:
      transmission of a location area code (LAC) different from the one transmitted by a macro network to which the consented user equipment (UE) is attached, and
      performing a procedure selected from at least one of an attach procedure and a tracking area update procedure, by the consented user equipment (UE);
   transmitting the retrieved identification number and a sensor identification number over a communication network through a communication module;
   matching the identification number with a mobile station international subscriber directory number (MSISDN) through a telecom server unit, wherein the mapped identification number and the mobile station international subscriber directory number (MSISDN) stored in a master table (MT) connected with the telecom server unit, wherein the master table (MT) stores the system identification number and non-personally identifiable information (non-PII);
   storing a plurality of consent status of the MSISDN in a consent database, wherein the consent database stores the MSISDN, the sensor identification number, a channel of activation, date and time stamp of activation, a consent flag, and a system identification number;
   receiving a sensor identification number, system identification number, and MSISDN through a database unit and the database unit further transmits an acknowledgment message to the consent database;

receiving the sensor identification number, system identification number, and MSISDN through an application server unit, wherein the application server unit stores data pertaining to a plurality of offers and transmits one or more offers to the consented user equipment (UE) through a predefined communication channel;

procuring data related to the user and transmitting the procured data to the application server unit through a retailer computing unit; and customizing the offer corresponding to the user based on the data related to a plurality of users through the application server, and transmitting the customized offer to the consented user equipment (UE), wherein the application server unit utilizes a machine learning module to process the data related to the user to customize the offer, wherein the machine learning module segments the users based on a plurality of numeric scores indicative of each user's association with a brand.

7. The method according to claim 6, wherein the application server unit further stores a replica of the consent database, a plurality of reports and analytics pertaining to the behavior of the user.

\* \* \* \* \*